Figure 1:
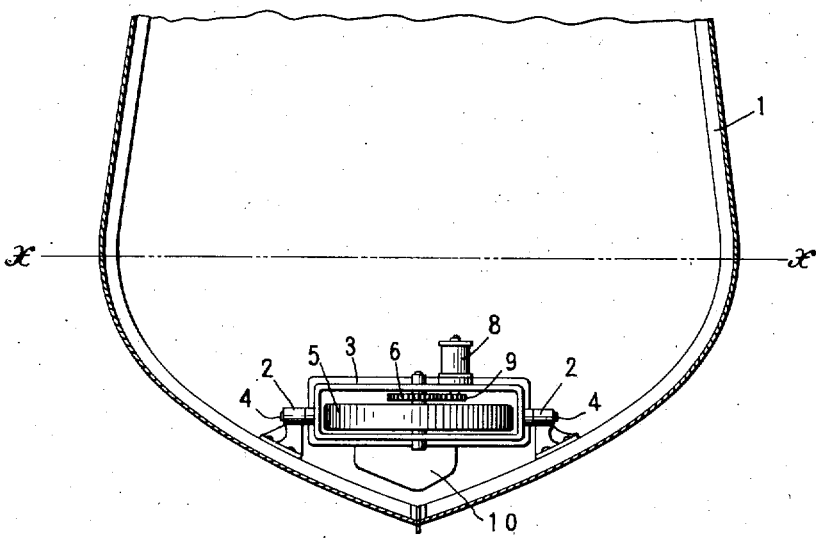

T. C. FORBES.

DEVICE FOR STEADYING SHIPS.

APPLICATION FILED AUG. 31, 1909.

Reissued June 23, 1914.

13,755.

2 SHEETS—SHEET 1.

WITNESSES:

J. Clyde Tipley.

E. B. Ryan

INVENTOR

Thomas C. Forbes.

BY

ATTORNEY

T. C. FORBES.

DEVICE FOR STEADYING SHIPS.

APPLICATION FILED AUG. 31, 1909.

Reissued June 23, 1914.

13,755.

2 SHEETS—SHEET 2.

WITNESSES:

J. Clyde Kipley.

E. B. Bradford.

INVENTOR

Thomas C. Forbes.

BY

ATTORNEY

UNITED STATES PATENT OFFICE.

THOMAS C. FORBES, OF LOS ANGELES, CALIFORNIA, ASSIGNOR, BY MESNE ASSIGNMENTS, TO SPERRY GYROSCOPE COMPANY, A CORPORATION OF NEW YORK.

DEVICE FOR STEADYING SHIPS.

Specification of Reissued Letters Patent. Reissued June 23, 1914.

13,755.

Original No. 769,693, dated September 13, 1904, Serial No. 138,185. Application for reissue filed August 31, 1909. Serial No. 515,549.

*To all whom it may concern:*

Be it known that I, THOMAS C. FORBES, a citizen of the United States of America, residing at Los Angeles, county of Los Angeles, State of California, formerly of Minneapolis, county of Hennepin, State of Minnesota, have invented certain new and useful Improvements in Devices for Steadying Ships, of which the following is a full, clear, and exact description, such as will enable others skilled in the art to which it appertains to make and use the same.

The essence of my invention consists in the direct application and utilization of gyroscopic and gyrostatic reaction to meet, oppose and largely overcome the angular motion of a body, the reaction originating from gyroscopic mechanism mounted directly upon the body itself. It must be remembered that the reactions of the gyroscope or gyrostat, as it is variously called, are not developed by nor do they respond to motion of translation or rectilinear motion in any plane or direction but only to motion of rotation or angular motion or motion about some axis or point, be the same near or remote, lying either within or without the structure or body treated.

To illustrate my invention and its operation I will describe it in connection with one of its applications as being conducive to a better understanding of its nature. The invention applies to other structures or bodies capable of or liable to disturbances by angular motion.

My invention has for one of its particular objects the prevention or diminution of the rocking or oscillation of ships or other vessels, craft or bodies subjected to like conditions or any condition tending to produce angular motion.

It has been proposed to allow weights to move to and fro, to employ the motion of a confined mass of water and also to utilize moving weights and pistons for maintaining a ship or other body substantially level, such weights or pistons being operated or set in action by mechanism controlled by various forms of pendulums and other devices. It has also been proposed to utilize a gyroscope for controlling another force for steadying a larger body as in the Gray British Patent #3552 of 1874. I propose to utilize gyroscopic action by mounting a gyroscope directly on the ultimate body to be steadied, which body is much larger and of materially greater weight than the gyroscope. By a gyroscope it should be understood that I refer to a mechanism which consists of a rotating mass carried by a pivoted frame. The rotating mass is variously known as a rotor or fly wheel but the name is of course, immaterial. The frame is pivoted so as to allow it to tilt or precess about an axis which extends at right angles to the axis of rotation of the fly wheel or rotor.

In the preferred form of the application of the invention to the motion of rolling or heeling of boats I mount the frame or support of the fly-wheel upon a horizontal axis extending transversely of the longitudinal axis of the vessel and I arrange the axis of the fly-wheel or rotor vertically. When the vessel starts to roll, the fly-wheel is inclined therewith in the direction of roll of the vessel and the gyroscopic action immediately tilts the frame about its said horizontal axis. The forces impressed upon the vessel tending to cause it to roll are thus transformed into angular motion of much greater magnitude setting up a powerful secondary reaction which I am enabled to utilize as above described. It is interesting to note that when this motion of precession extends through wide angles forces are developed in the extreme position tending to cause the vessel to pitch. The proportions between the width and length of the vessel however is such, that the actual resulting pitching movement is inappreciable. If the force tending to roll the vessel is slight the power of the gyroscope will practically prevent any rolling action whatever. When the force tending to roll the ship is considerable compared to the power of the gyroscope, the rolling will be diminished and retarded by the gyroscope but may not be entirely eliminated. In any case however when the vessel rolls to one side for instance port, the fly-wheel axis and the supporting frame will tilt forward (or backward as the case may be, depending on the direction of rotation of the fly-wheel) only once during the rolling action and will remain at its extreme forward (or rearward) inclined angle as long as the vessel continues in the outward port roll. When the vessel begins its return motion of rolling to starboard, the fly-wheel axis and frame, if allowed, will immediately begin to swing backward (or forward) and will take up its extreme backward inclination and retain that position until the vessel reaches its extreme outward starboard roll. The rolling of the vessel thus causes oscillation of the frame and fly-wheel with the important results which are described above. The time occupied by the fly-wheel frame in its tilting or precession will depend upon the period of the roll of the vessel and upon the resistance offered to the gyroscope to the precessional action, such as the lifting of weights, resistance of the air or other medium, friction of the bearings or gudgeons and other attached parts. As the reaction of the gyroscope persists only during the precessional action it is desirable in order to procure the lowest operating stresses to prolong this action as much as possible. In the rolling action the precession of the gyroscope could continue only until the fly-wheel axis is parallel with the axis about which the body or vessel rolls. It is desirable to maintain the gyroscope with its fly-wheel axis normally vertical so as to respond equally well to an initial action in either direction. It is also desirable to retard the precessional action and thus absorb the force of the rolling motion gradually. In the simple form herein illustrated I have shown a weight attached to the tilting frame which not only tends to center the gyroscope but to limit and retard the precession or angular movement of the frame. As the frame is tilted in precession, the weight is lifted and its moment arm increased as the fly-wheel axis approaches a horizontal position where the tilting force received from the body tapers off to zero. The weight thus acts as a gradually increasing resistance to the tilting force which it thus finally balances if the progress of the precession is not prevented too early as by a stop or other means. It is desirable that the two axes of the gyroscope, that is, the fly-wheel and precessional axes be in the same transverse plane. In the form shown the fly-wheel is driven by a motor of suitable character such as electric which is preferably mounted on the frame of the gyroscope so that it is always in proper driving relation with the fly-wheel.

While the construction referred to is preferred there may be times where different angular relations may be useful. For instance, in some cases it may be desirable to mount the gyroscope with its fly-wheel axis horizontal and its precessional axis vertical and both of them transverse to the longitudinal axis of the vessel or the axis of the gyration of the body. Such a construction would tend to diminish the rolling action of the vessel but as the precession would be generally in a horizontal plane the reaction if persisted in through too great an angle might tend to throw the vessel off her course which might be argued as an objection. But it should be recalled that the impulses are of opposite phase and altogether too short in duration to cause response on the part of a large mass.

Figure 2:
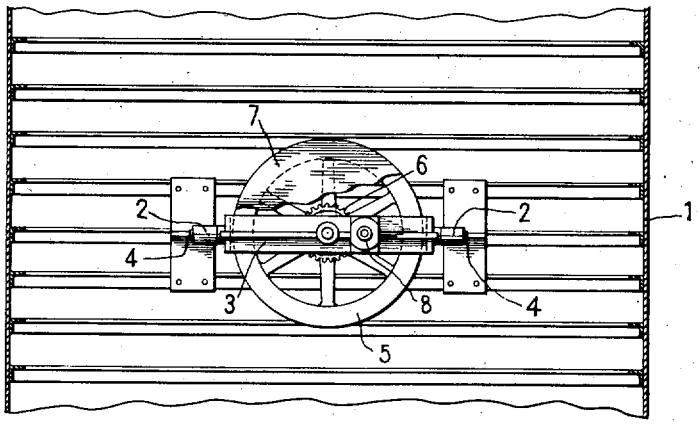
Figure 3:
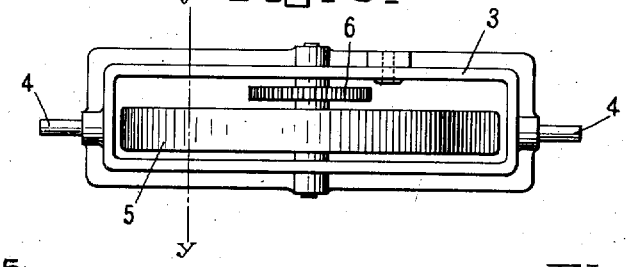
Figure 5:
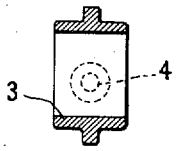
Figure 4:
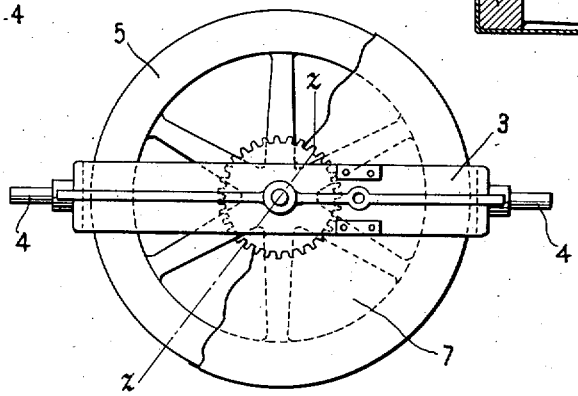
Figure 6:
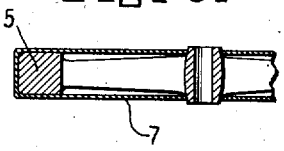
Figure 7:
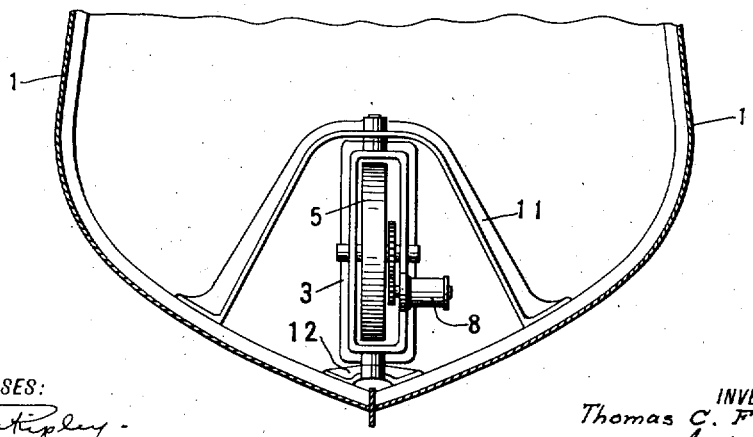

Figure 1, is a transverse vertical section of the body of a vessel and showing a front view of my steadying device applied in working position. Fig. 2, is a plan and horizontal section approximately on the plane of the line X—X of Fig. 1 and showing a part of a casing in place. Fig. 3, is a front view corresponding in the direction in which it is viewed to Fig. 1 and showing a part of the steadying device removed from working position. Fig. 4, is a plan view of the same with part of a casing in place. Fig. 5, is a vertical section through the frame of the gyroscope on the plane of the line Y—Y of Fig. 3. Fig. 6, is a vertical section of the fly-wheel on the plane of the line Z—Z, Fig. 4. Fig. 7, is a view similar to Fig. 1 of a modified arrangement.

The hull or body 1 of the vessel carries a suitable pair of bearings such as 2, 2 which preferably are rigid and spaced apart to support the frame of the gyroscope.

The frame 3 of suitable form has a pair of trunnions such as 4, 4 pivotally supported in the bearings 2, 2 so as to permit the frame to tilt about a horizontal axis transverse to the longitudinal axis of the vessel. The fly-wheel 5 which constitutes the rotor of the gyroscope is rotatably mounted on a normally vertical axis in suitable bearings carried by the frame 3. The fly-wheel may be covered with a thin smooth casing such as 7 made for instance of sheet metal so as to reduce to a minimum the friction of the air on it while in rotation. On the hub or shaft of the fly-wheel is secured a spur gear 6. The fly-wheel is conveniently driven from a suitable motor 8, for instance an electric motor, which is rigidly secured on the frame 3 and the armature shaft of which carries the pinion 9 running in mesh with the gear 6. The motor 8 will therefore of course move with the frame 3 and always maintain a proper driving position in respect to the gear 6 and the fly-wheel 5. A weight 10 is applied to the lower portion of the frame 3 to give the fly-wheel a tendency to stand in a horizontal position and thus resist the precessional action.

By experiments with the above device applied to a rowboat as shown in Figs. 1 and 2 hereof, I have found that even when the waves are running high the rocking motions of the boat may be entirely overcome or reduced to such an extent that they are practically imperceptible but the end-wise pitch is not effected.

In Fig. 7 the axis of the fly-wheel is horizontal and the axis of the frame 8 is vertical, its trunnions being journaled or pivoted in the upper bearing yoke 11 and the lower step or bearing 12 which parts are rigidly secured to the hull of the vessel or body. Such an arrangement will counteract a rolling tendency of the vessel.

By the use of my invention in its preferred form the oscillation of a body as for instance, the rolling of a vessel, may be diminished greatly and in some cases practically eliminated. In any case it will so retard the rolling action and may also increase the normal period of oscillation of the vessel as to avoid such accidents and discomfort as are usually incidental to the normal rolling of a vessel.

My invention consisting of a gyroscope or gyrostat mounted directly upon or supported by a body for the definite purpose of controlling, counteracting or extinguishing angular motion on the part of the body through direct gyroscopic reaction as described, has many and varied uses and it is believed that the utilization of the power of so great magnitude as applied by me in the manner described should lead to the easy solution of many problems and greatly extend the usefulness of many important mechanisms, structures and processes in the different industries.

What I claim is:—

1. The combination of a body capable of oscillation, a revoluble wheel of relatively smaller weight than that of the body, a pivoted frame supporting said wheel and so mounted upon the body that the axis of both wheel and frame are at a substantial angle to each other and to the general axis of oscillation of the body whereby the motion of the frame upon its pivots generates stresses directly opposing the oscillation.

2. The combination of a body capable of oscillation, a revoluble wheel of relatively smaller weight than that of the body, a pivoted frame supporting said wheel and so mounted upon the body that the axis of both wheel and frame are at a substantial angle to each other and to the general axis of oscillation of the body whereby the oscillation first induces motion of the frame upon the pivots thereby generating new gyroscopic reactions so directed as to directly overcome said oscillation.

3. The combination with a body of a steadying device comprising, a fly-wheel support mounted to oscillate through wide angles on an axis lying generally in the plane of motion to be counteracted, a fly-wheel of relatively smaller weight than that of the body journaled in said support with its axis extending transversely of the axis of said support and transverse to the axis of said body, means for tending to hold the fly-wheel in the mid position of its oscillation and means for rotating said fly-wheel whereby the gyroscopic reaction of the oscillating support directly steadies the body.

4. The combination of a body subject to angular motion about an axis, of bearings carried by the body opposite to each other and on a line extending transversely of the axis, a frame journaled in said bearings and permitted to swing through wide angles in each side of its swinging position and a fly-wheel of relatively smaller weight than that of the body adapted to rotate carried by said frame on an axis transverse to the pivot axis of said frame and also transverse to said axis of motion of the body whereby a substantial part of the power or stress applied to impart the said angular motion to the body is transformed into the back and forth swinging movement of the fly-wheel and connected parts and thus neutralized.

5. The combination with a body of a fly-wheel support mounted to oscillate through wide angles on an axis extending transversely of the axis of the body, a fly-wheel of relatively smaller weight than that of the body journaled in said oscillatory support with its axis extending transversely of the axis of said support and of the longitudinal axis of the body and means for rotating said fly-wheel normally in a plane extending in the general direction parallel to the longitudinal axis of the body whereby the gyroscopic reaction directly opposes oscillation of said body.

6. The combination with a body subjected to forces tending to roll it about a certain axis, of a steadying device comprising a fly-wheel support mounted to oscillate through wide angles on an axis lying generally in the plane of the forces to be counteracted, a fly-wheel of relatively smaller weight than that of the body journaled in said support with its axis extending transversely of the axis of said support and the said axis of said body and means for rotating said fly-wheel whereby the gyroscopic reaction directly opposes the tendency of the body to roll.

7. The combination with a body, of a steadying device comprising a fly-wheel support mounted to oscillate on an axis lying generally in the plane of motion to be counteracted, a fly-wheel of relatively smaller weight than that of the body journaled in said support with its axis extending transversely of the axis of said support, means for rotating said fly-wheel and means for limiting the angular movement of the support whereby the gyroscopic reaction serves directly to steady the body.

8. The combination with a moving body, of a steadying device comprising a freely rotatable wheel of a relatively smaller weight than that of the said body, a mounting for said wheel journaled to oscillate through wide angles in a plane at right angles to the plane of motion to be counteracted and means to maintain said wheel in rotation at a speed sufficient to generate a couple tending directly to neutralize the disturbing force substantially as described.

9. The combination with a body subject to angular motion about an axis, of a steadying device carried by said body and comprising, a frame journaled to swing through substantial angles on an axis transverse to the axis of said motion, a fly-wheel of relatively smaller weight than that of the body rotatably carried by said frame with its axis transverse to the axis of motion of said body and transverse to but in the same plane with the axis of said support and a motor carried by said frame for rotating said fly-wheel whereby gyroscopic reaction is created to directly oppose the angular motion of said body.

10. The combination with a body subject to angular motion about an axis, of a steadying device comprising, a frame journaled to swing through wide angles on an axis transverse to the said axis of the body, a fly-wheel of relatively smaller weight than that of the body carried by said frame adapted to rotate on an axis transverse to the axes of said frame and said body and means tending to limit the swinging of said frame whereby a substantial part of the power or stress tending to oscillate said body is absorbed by the swinging of said frame and fly-wheel.

11. The combination with a body subject to angular motion about an axis, of a steadying device comprising, a frame journaled to swing through wide angles on an axis transverse to the said axis of the body, a fly-wheel of relatively smaller weight than that of the body carried by said frame adapted to rotate on an axis transverse to the axes of said frame and said body and means for gradually retarding the swinging of said frame whereby a substantial part of the power or stress tending to oscillate said body is absorbed by the swinging of said frame and fly-wheel.

12. The combination with a body subject to movement about an axis, of a steadying device comprising a frame journaled to swing through wide angles on an axis transverse to the said axis of the body, a fly-wheel of relatively smaller weight than that of the body carried by said frame adapted to rotate on an axis transverse to the axis of said frame and also normally transverse to the said axis of said body and means for retarding the swinging of said frame whereby a substantial part of the power tending to oscillate said body is absorbed by the swinging of said frame and fly-wheel.

13. The combination with a body subject to oscillation and means on or about the body for resisting oscillation of the body about one axis while leaving it completely free to oscillate about another axis, including bearings or pivots carried by the body, the axis of the bearings or pivots being transverse to the said axis of free oscillation, a frame pivoted upon the said transverse axis and permitted to swing through wide angles each side of its central position and a fly-wheel of relatively smaller weight than that of the body carried by said frame adapted to rotate with its axis transverse to the pivoted axis of the frame and parallel to the said axis of free oscillation of the body whereby a substantial part of the power or stress imparted to oscillate the body is absorbed by the back and forth swinging movement of the fly-wheel and its frame and connected parts.

THOMAS C. FORBES.

Witnesses:
JOHN J. HILDNER,
G. F. MCCULLOCH.